United States Patent
Long et al.

(10) Patent No.: US 8,462,658 B2
(45) Date of Patent: Jun. 11, 2013

(54) COOPERATIVE COMMUNICATION METHOD AND BASE STATION

(75) Inventors: Yi Long, Beijing (CN); Yunbo Li, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 13/316,934

(22) Filed: Dec. 12, 2011

(65) Prior Publication Data

US 2012/0082118 A1  Apr. 5, 2012

Related U.S. Application Data

(63) Continuation of application No. PCT/CN2010/076761, filed on Sep. 9, 2010.

(30) Foreign Application Priority Data

Sep. 9, 2009  (CN) .......................... 2009 1 0190164

(51) Int. Cl.
   *G01R 31/08* (2006.01)
(52) U.S. Cl.
   USPC ............ 370/252; 370/329; 375/260; 455/500
(58) Field of Classification Search
   CPC . H04L 25/03343; H04L 1/0026; H04L 5/0007; H04B 7/0417; H04B 7/0617
   USPC ................. 370/252, 280, 328, 329; 375/260, 375/267, 295; 455/500, 501, 69
   See application file for complete search history.

(56) References Cited

U.S. PATENT DOCUMENTS

| | | | |
|---|---|---|---|
| 7,660,607 B2 | 2/2010 | Oh et al. | |
| 7,929,632 B2 | 4/2011 | Shao | |
| 2008/0192849 A1* | 8/2008 | Kim et al. | 375/260 |
| 2010/0046650 A1* | 2/2010 | Jongren et al. | 375/260 |
| 2010/0048232 A1* | 2/2010 | Hwang et al. | 455/501 |

(Continued)

FOREIGN PATENT DOCUMENTS

| | | |
|---|---|---|
| CN | 1773885 A | 5/2006 |
| CN | 1849769 A | 10/2006 |
| WO | 2005057838 A1 | 6/2005 |
| WO | 2008030035 A2 | 3/2008 |

OTHER PUBLICATIONS

International Search Report for International Patent Application No. PCT/CN2010/076761, dated Dec. 16, 2010, 3 pages total.

(Continued)

*Primary Examiner* — Jung Park (57) ABSTRACT

A cooperative communications method for a wireless network and a corresponding apparatus. In one embodiment, the method includes: obtaining a matrix corresponding to a destination Mobile Station (MS), where the number of rows of the matrix depends on the total number of antennas of MSs in a cooperative area and the number of antennas of the destination MS, and the number of columns of the matrix depends on the number of code streams sent to the destination MS; calculating a precoding matrix according to local Channel State Information (CSI) and the matrix; performing precoding according to the precoding matrix; and performing cooperative communication according to a result of the precoding. The method of this embodiment enables the reduction or elimination of interference between users by specifying a direction matrix, and is applicable to multi-antenna MSs. A cooperative base station (BS) applicable to the foregoing method is also disclosed.

6 Claims, 5 Drawing Sheets

U.S. PATENT DOCUMENTS

| | | | |
|---|---|---|---|
| 2010/0080154 A1* | 4/2010 | Noh et al. ...................... | 370/310 |
| 2010/0172430 A1* | 7/2010 | Melzer et al. .................. | 375/267 |
| 2011/0110403 A1* | 5/2011 | Jongren ......................... | 375/219 |
| 2011/0261860 A1* | 10/2011 | Zhang et al. ................... | 375/130 |
| 2011/0280342 A1* | 11/2011 | Kim et al. ...................... | 375/316 |

OTHER PUBLICATIONS

Zakhour et al.,"Distributed Multicell-MISO Precoding Using the Layered Virtual SINR Framework", IEEE Transactions on Wireless communications, vol. 9, No. 8, Aug. 2010, 5 pages total.

Zakhour et al.,"Coordination on the MISO Interference Channel Using the Virtual SINR Framework", Mobile Communications Department, EURECOM, 06560 Sophia Antipolis, France, 2009, 7 pages total.

Alcatel-Lucent Shanghai Bell, Alcatel-Lucent, "Downlink non-coherent SU-CoMP schemes comparison for TDD systems," Agenda 15.2, 3GPP TSG RAN WG1 Meeting #57, R1-092159, San Francisco, USA, May 4-8, 2009, 6 pages total.

Office action issued in corresponding Chinese patent application No. 200910190164.4, dated Jul. 4, 2012, and English translation thereof, total 6 pages.

Written Opinion issued in corresponding PCT application No. PCT/CN2010/076761, dated Dec. 16, 2010, total 3 pages.

Search report issued in corresponding European Patent Application No. 10815002.0, mailed Mar. 15, 2012, 7 pages total.

Holakouei et al.,"Precoded Multiuser Distributed MIMO OFDM Systems", Proc IEEE International Symposium on Wireless Communication Systems—ISWCS, Italy, Sep. 2009, pp. 605-608.

Jin et al., "A Novel Cooperative Multi-Cell MIMO Scheme for the Downlink of LTE-Advanced System," Communication Workshops, 2009.ICC Workshops 2009.IEEE, International Conference, IEEE, Piscataway, NJ, USA, Jun. 14, 2009, pp. 1-5.

* cited by examiner

COOPERATIVE COMMUNICATION METHOD AND BASE STATION

CROSS-REFERENCE TO RELATED APPLICATIONS

This application is a continuation of International Patent Application No. PCT/CN2010/076761, filed on Sep. 9, 2010, which claims priority to Chinese Patent Application No. 200910190164.4, filed on Sep. 9, 2009, both of which are hereby incorporated by reference in their entireties.

FIELD OF THE INVENTION

The present invention relates to the field of wireless communication technologies, and in particular, to a method and apparatus for cooperative communications in a wireless network.

BACKGROUND OF THE INVENTION

In a Cooperative Multi-Input Multi-Output (Co-MIMO) system, a Base Station (BS) obtains Channel State Information (CSI) of a Mobile Station (MS), and communicates with the MS through a Space Division Multiple Access (SDMA) technology according to the CSI.

In distributed Co-MIMO systems in the prior art, the cooperative BSs do not exchange real-time CSI or statistical CSI with each other, and the precoding matrix of each BS is calculated according to the real-time local CSI only. This scheme is not limited by the backhaul delay or capacity. Because it is not necessary to process CSI in a centralized way, higher extensibility is realized. Moreover, the distributed Co-MIMO scheme is closer to the existing cellular network architecture, and the involved protocol modification is relatively simple. However, the distributed Co-MIMO system in the prior art are mostly applied in single-user, multi-antenna scenarios or multi-user, single-antenna scenarios. In a multi-user, multi-antenna scenario, the number of antennas of each BS needs to be greater than the total number of antennas of the MSs served by the BS, which obviously restricts the application of the scheme.

SUMMARY OF THE INVENTION

Embodiments of the present invention provide methods and apparatus for cooperative communications in a wireless network, which may serve multiple mobile stations (MSs) with multiple antennas simultaneously.

One embodiment of the present invention consists of a cooperative communication method in a wireless network, comprising: obtaining a matrix corresponding to a destination MS, where the number of rows of the matrix depends on the total number of antennas of MSs in a cooperative area and the number of antennas of the destination MS, and the number of columns of the matrix depends on the number of code streams sent to the destination MS; calculating a precoding matrix according to local CSI and the matrix; performing precoding according to the precoding matrix; and performing cooperative communications according to a result of the precoding.

Another embodiment of the present invention consists of a cooperative base station (BS), comprising: a matrix determining unit configured to obtain a matrix corresponding to a destination MS, where the number of rows of the matrix depends on the total number of antennas of MSs in a cooperative area and the number of antennas of the destination MS, and the number of columns of the matrix depends on the number of code streams sent to the destination MS; a calculating unit configured to calculate a precoding matrix according to local CSI and the matrix; a precoding unit configured to perform precoding according to the precoding matrix; and a communication unit configured to perform cooperative communication according to a result of the precoding.

Yet another embodiment of the present invention consists of a system for performing cooperative communications in a wireless network, comprising: a base station (BS) configured to obtain a matrix, calculate a precoding matrix according to local channel state information (CSI) and the matrix, and perform precoding according to the precoding matrix; and a first mobile station (MS); wherein: the BS and the first MS are located within a cooperative area and are configured to cooperatively communicate with each other according to a result of the precoding, and the matrix corresponds to the first MS, and the number of rows of the matrix depends on the total number of antennas of MSs in the cooperative area and the number of antennas of the first MS, and the number of columns of the matrix depends on the number of code streams sent to the first MS.

DETAILED DESCRIPTION

Embodiments of the present invention provide a distributed cooperative communication method and apparatus. The method and apparatus enable the reduction or elimination of interference between users by specifying a direction matrix, and is applicable to multi-antenna MSs.

Figure 1:
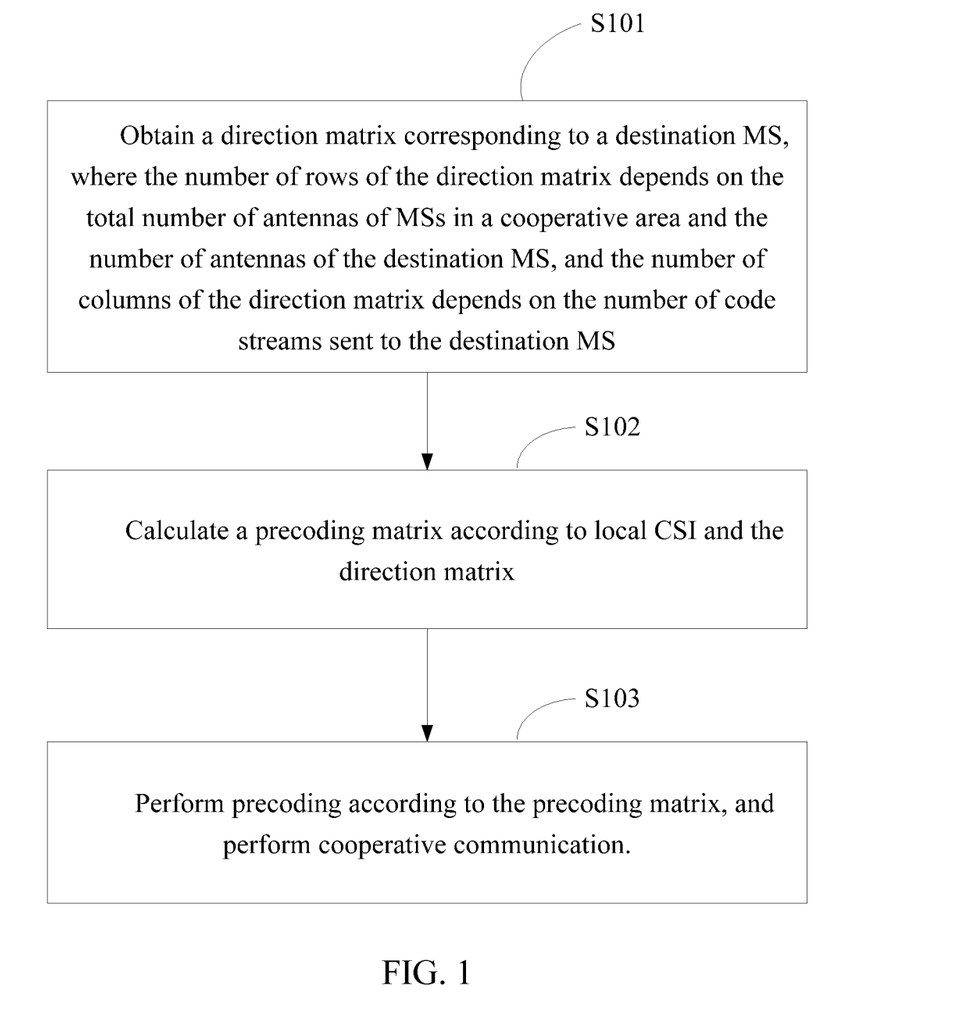
FIG. 1 is a flowchart according to an embodiment of the present invention.

FIG. 1 is a method flowchart according to an embodiment of the present invention.

S101. Obtain a direction matrix corresponding to a destination MS, where the number of rows of the direction matrix depends on the total number of antennas of MSs in a cooperative area and the number of antennas of the destination MS, and the number of columns of the direction matrix depends on the number of code streams sent to the destination MS.

S102. Calculate a precoding matrix according to local CSI and the direction matrix.

S103. Perform precoding according to the precoding matrix, and perform cooperative communication.

The methods and apparatus disclosed herein enables the reduction or elimination of interference between users by specifying a direction matrix. In a multi-user multi-antenna scenario, the use of a direction matrix avoids the following restriction: The total interference is not zero unless the interference caused by every cooperative BS onto all MSs other than the destination MS is zero. Therefore, the number of antennas of a BS is not restricted, namely, fewer antennas of the BS can accomplish good effects.

Figure 2:
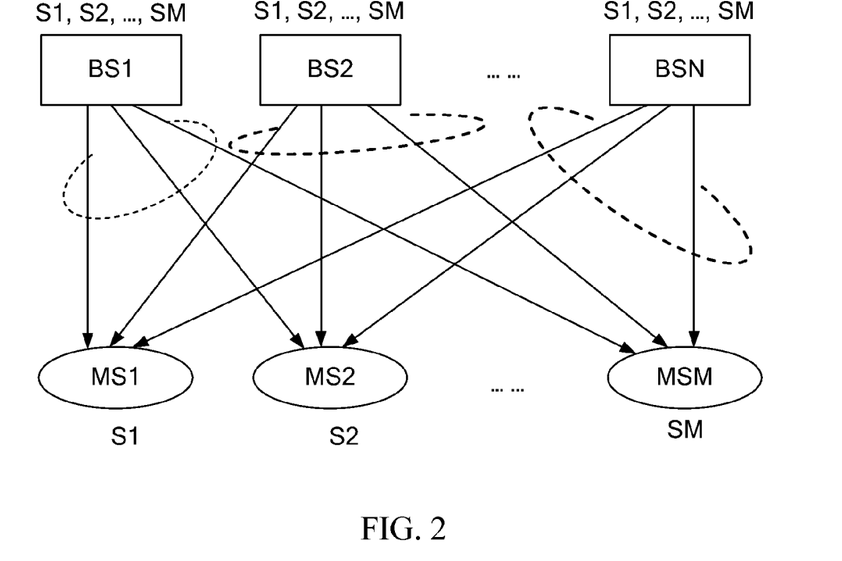
FIG. 2 is a schematic diagram of a first application scenario according to an embodiment of the present invention.

As shown in FIG. 2, the method in a specific application scenario is detailed below. In this embodiment, it is assumed that N BSs cooperate to serve M MSs. Each BS has data information to be sent to all MSs and has a local CSI. For example, Si refers to data information to be sent to the MS numbered i. Each BS calculates a precoding matrix for each MS according to the local CSI. The local CSI refers to the CSI between a current BS and all MSs in a cooperative set, and global CSI refers to the CSI between all cooperative BSs and all MSs in the cooperative set.

S201. The BS obtains a direction matrix corresponding to an MS.

The number of rows of the direction matrix is equal to the total number of antennas of MSs minus the number of antennas of the MS to be precoded, and the number of columns of the direction matrix is equal to the number of code streams of the MS to be precoded. In practice, a set of direction matrices is generated for each MS served by the BSs. The number of direction matrices in each set of direction matrices is the same as the number of cooperative BSs. One direction matrix in each set of direction matrices is assigned to each BS. The norm of the sum of a set of direction matrices for each MS represents the extent of interference caused by the signal sent to this MS onto other MSs. If the sum of a set of direction matrices is a zero matrix, it means that the interference caused by the signal sent to the corresponding MS onto other MSs is eliminated. In a practicable communication system, an upper threshold may be set to restrict the norm of the sum matrix of the direction matrices of all BSs corresponding to each MS. For example, the upper threshold of the norm of the sum matrix (corresponding to the interference strength) is the noise strength. After the number of rows and the number of columns of the direction matrix are determined, the values of the elements are random. Preferably, the matrix is a unit matrix or U-matrix compliant with the requirements of rows and columns. However, the norm of the sum of a set of direction matrices corresponding to a destination MS should meet requirements to eliminate or mitigate interference.

The total number of cooperative BSs is N, the number of antennas of BS i is $n_i$, the number of MSs is M, the number of antennas of MS j is $m_j$, and the number of code streams of data received by MS j is $r_j$. For the receiving signal of MS k, a set of direction matrices is generated, and expressed as $C_i$, i=1,2, . . . , N. The number of rows of $C_i$ is $$\sum_{i \neq k} m_i,$$

and the number of columns is $r_k$. Each BS obtains one matrix in this set of direction matrices.

$$\left\| \sum_{i=1}^{N} C_i \right\|$$

represents the extent of interference caused by the signal of this MS onto other MSs. If $$\sum_{i=1}^{N} C_i = 0,$$

the interference caused by the receiving signal of MS k onto other MSs is eliminated.

In practice, the direction matrix may be obtained in many modes. Mode 1: Each MS has a master BS, and other BSs are slave BSs of the master BS. The master BS generates, through calculation, a set of direction matrices for all cooperative BSs, and then sends each direction matrix to the corresponding cooperative BS respectively. In this mode, the master BS calculates the direction matrix, and the slave BSs receive the direction matrix sent by the master BS. Mode 2: Suppose that a scheduling party such as a scheduling controller exists in the Co-MIMO network, and all BSs in the cooperative set are controlled by the scheduling controller. The scheduling controller may generate, for a transmitting signal of each MS, a set of direction matrices compliant with the foregoing requirements. Afterward, each direction matrix is sent to the corresponding BS respectively. In this mode, the BS receives the direction matrix sent by the scheduling party. Mode 3 (distributed negotiation scheme): Suppose that N BSs exist in the cooperative set, and the order of the BSs is defined. Each cooperative BS generates, in the same way, a set of direction matrices for all MSs served by the current BS respectively, and selects the direction matrix corresponding to the sequence number of the current BS. In this mode, the direction matrix is calculated by the BS itself Mode 4: Suppose that N BSs exist in the cooperative set, and the order of the BSs is defined. BS 1 selects a direction matrix corresponding to each MS, and then sends the selected direction matrix to the cooperative BS 2-N; BS 2 selects its own direction matrix corresponding to each MS on the basis of the direction matrix of BS 1, and sends the selected direction matrix to cooperative BS 3-N. This process goes on until all BSs obtain the direction matrix specific to each MS and meet the foregoing requirements for the direction matrix.

The direction matrix may be sent in the form of matrices, or sent by means of codebook indexes. When the direction matrix is sent by means of a codebook index, it is necessary to set up a codebook of the direction matrix in all cooperative BSs beforehand. The slave BSs receive the codebook index, and then obtain a desired direction matrix by searching for the codebook index in the direction matrix codebook.

S202. Calculate a precoding matrix according to local CSI and the direction matrix.

Each BS obtains the real-time local CSI through feedback or channel estimation. The BS calculates the precoding matrix for data of each corresponding MS according to the local CSI and the allocated direction matrix.

For the purpose of calculating, for BS j, the precoding matrix of the data sent by MS i, let $C_{ij}$ be the obtained direction matrix, let $H_{\overline{ij}}$ be the channel state matrix between BS j and MSs in all cooperative sets except MS i, and let $W_{ij}$ be the precoding matrix to be obtained through calculation. Then $H_{\overline{ij}} W_{ij} = C_{ij}$.

S203. Perform precoding according to the precoding matrix, and perform cooperative communication.

Multiply the signal of each MS by its precoding matrix, and overlay the products to finish precoding. Perform cooperative communication through downlink sending.

Send the precoding matrix along with the data of the MS through downlink broadcast. Let $S_i$ be the signal sent by BS j to MS i, and let $W_{ij}$ be the precoding matrix. The total transmitting signal of BS j is:

$$Y_j = W_{1j}S_1 + W_{2j}S_2 + \ldots + W_{Mj}S_M.$$

The method in this embodiment enables the eliminating of interference between users by specifying a direction matrix, and is applicable to multi-antenna MSs.

Further, the mode of calculating the precoding matrix in this embodiment may be, but is not limited to, Zero Forcing (ZF) and Minimum Mean Square Error (MMSE). Several instances of calculating the precoding matrix are described below, taking the ZF as an example.

Figure 3:
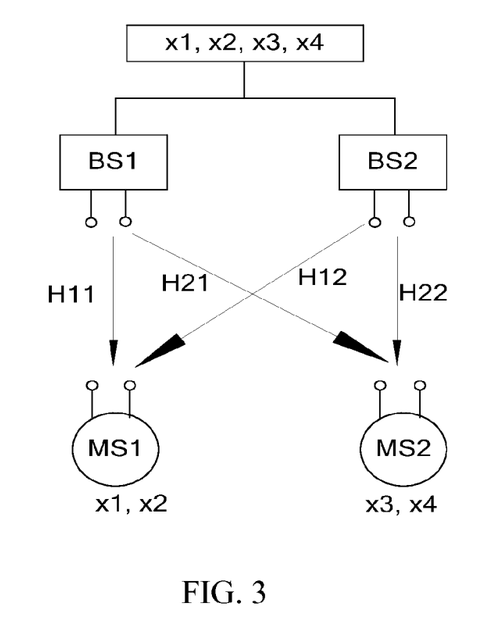
FIG. 3 is a schematic diagram of a second application scenario according to an embodiment of the present invention.

In the instance as shown in FIG. 3, 2 BSs and 2 MSs exist, each BS has 2 antennas, and each MS has 2 antennas. Each BS has data of 2 MSs, and each BS has only local CSI. The 2 BSs are BS 1 and BS 2, and the 2 MSs are MS 1 and MS 2; x1 and x2 are signals received by MS 1, x3 and x4 are signals received by MS 2; and x1-x4 are shared by BS 1 and BS 2. BS 1 owns local CSI expressed as H 11 and H 21, and BS 2 owns local CSI expressed as H 12 and H 22. The global CSI is:

$$H = \begin{bmatrix} H_{11} & H_{12} \\ H_{21} & H_{22} \end{bmatrix} = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix}. \quad (1)$$

First, we calculate the precoding matrix for signals x1 and x2 of MS 1. Let the precoding matrix of BS 1 for MS 1 be $W_{11}$, let the precoding matrix of BS 2 for MS 1 be $W_{12}$, specify the direction matrix of BS 1 as $C_1$, and specify the direction matrix of BS 2 as $C_2$.

$$C_1 = \begin{bmatrix} 1 & 0 \\ 0 & 1 \end{bmatrix}, \quad C_2 = \begin{bmatrix} -1 & 0 \\ 0 & -1 \end{bmatrix} \quad (2)$$

Therefore, the direction matrix needs to be equal to the product of the precoding matrix and the channel matrix between the current BS and other MSs except the destination MS, which is expressed as:

$$H_{21}W_{11} = C_1 \quad (3)$$

$$H_{22}W_{12} = C_2 \quad (4)$$

It should be emphasized that $C_1$ and $C_2$ are selected randomly, and the interference can be eliminated as long as $C_1+C_2=0$. By solving equations (3) and (4), we obtain:

$$W_{11} = \frac{1}{h_{31}h_{42} - h_{32}h_{41}} \begin{bmatrix} h_{42} & -h_{32} \\ -h_{41} & h_{31} \end{bmatrix} \quad (5)$$

$$W_{12} = \frac{1}{h_{33}h_{44} - h_{34}h_{43}} \begin{bmatrix} -h_{44} & h_{34} \\ h_{43} & -h_{33} \end{bmatrix} \quad (6)$$

In the same way, the precoding matrices of BS 1 and BS 2 for x3 and x4 are obtained.

Figure 4:
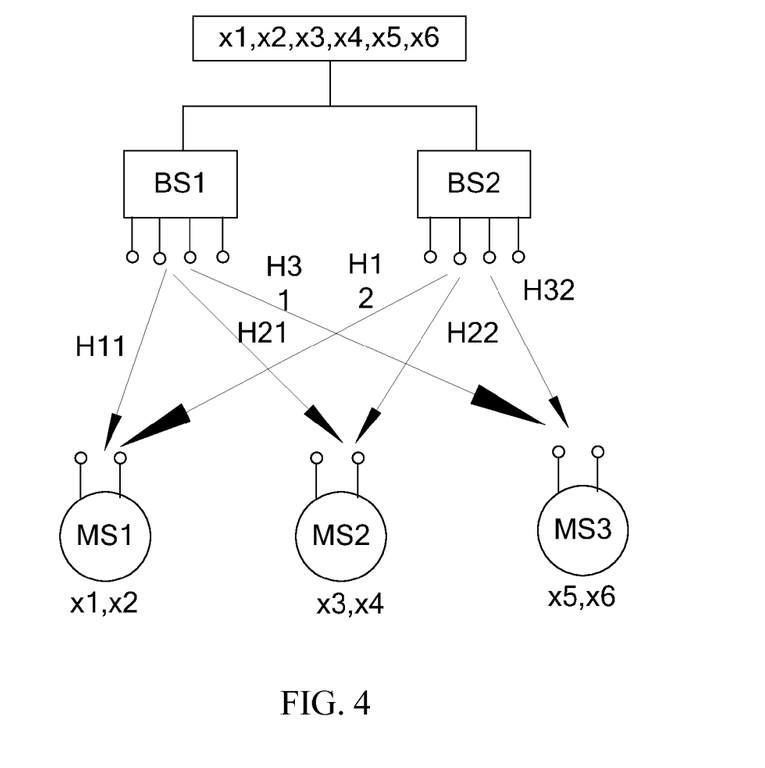
FIG. 4 is a schematic diagram of a third application scenario according to an embodiment of the present invention.

As shown in FIG. 4, there are 2 BSs and 3 MSs. In this instance, each BS has 4 antennas, each MS has 2 antennas, and each BS has data of 3 MSs.

Each BS has local CSI only.

The 2 BSs are BS 1 and BS 2, and the 2 MSs are MS 1 and MS 2; x1 and x2 are signals received by MS 1, x3 and x4 are signals received by MS 2; x5 and x6 are signals received by MS 3; and x1-x6 are shared by BS 1 and BS 2. BS 1 owns local CSI expressed as H 11, H 21, and H31; and BS 2 owns local CSI expressed as H 12, H 22, and H 32. The global CSI is:

$$H = \begin{bmatrix} H_{11} & H_{12} \\ H_{21} & H_{22} \\ H_{31} & H_{32} \end{bmatrix} = \begin{bmatrix} h_{11} & h_{12} & h_{13} & h_{14} & h_{15} & h_{16} & h_{17} & h_{18} \\ h_{21} & h_{22} & h_{23} & h_{24} & h_{25} & h_{26} & h_{27} & h_{28} \\ h_{31} & h_{32} & h_{33} & h_{34} & h_{35} & h_{36} & h_{37} & h_{38} \\ h_{41} & h_{42} & h_{43} & h_{44} & h_{45} & h_{46} & h_{47} & h_{48} \\ h_{51} & h_{52} & h_{53} & h_{54} & h_{55} & h_{56} & h_{57} & h_{58} \\ h_{61} & h_{62} & h_{63} & h_{64} & h_{65} & h_{66} & h_{67} & h_{68} \end{bmatrix}. \quad (7)$$

First, we calculate the precoding matrix for signals x1 and x2 of MS 1. Let the precoding matrix of BS 1 for MS 1 be $W_{11}$, let the precoding matrix of BS 2 for MS 1 be $W_{12}$, specify the direction matrix of BS 1 as $C_1$, and specify the direction matrix of BS 2 as $C_2$.

$$C_1 = \begin{bmatrix} 1 & 0 \\ 0 & 1 \\ 0 & 0 \\ 0 & 0 \end{bmatrix}, \quad C_2 = \begin{bmatrix} -1 & 0 \\ 0 & -1 \\ 0 & 0 \\ 0 & 0 \end{bmatrix}, \quad (8)$$

Then, $$\begin{bmatrix} H_{21} \\ H_{31} \end{bmatrix} W_{11} = C_1 \quad (9)$$

$$\begin{bmatrix} H_{22} \\ H_{32} \end{bmatrix} W_{12} = C_2 \quad (10)$$

It should be emphasized that $C_1$ and $C_2$ are selected randomly, and the interference can be eliminated as long as $C_1+C_2=0$. Notice that $$\begin{bmatrix} H_{21} \\ H_{31} \end{bmatrix}$$

and $$\begin{bmatrix} H_{22} \\ H_{32} \end{bmatrix}$$

are 4×4 matrices. Under the Independent and Identically Distributed (IID) channel conditions, two matrices are nonsingular and their inverse matrices exist. By solving equations (9) and (10), we obtain:

$$W_{11} = inv\left(\begin{bmatrix} H_{21} \\ H_{31} \end{bmatrix}\right) C_1 \quad (11)$$

$$W_{12} = inv\left(\begin{bmatrix} H_{22} \\ H_{32} \end{bmatrix}\right) C_2 \quad (12)$$

In the same way, the precoding matrices of BS 1 and BS 2 for MS 2 and MS 3 can be obtained.

Figure 5:
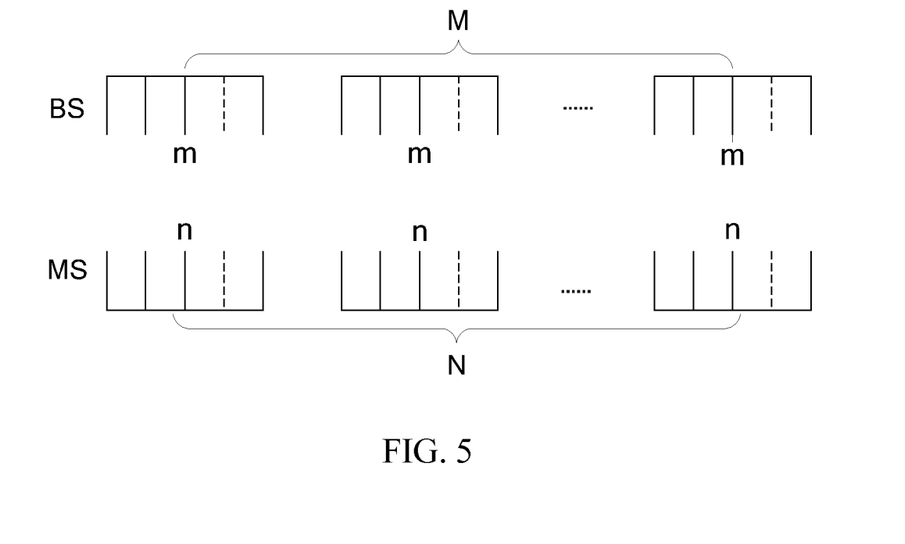
FIG. 5 is a schematic diagram of a fourth application scenario according to an embodiment of the present invention.

FIG. 5 shows a more common scenario. Suppose a cooperative set includes M BSs, and each BS has m antennas; there are N MSs, and each MS has n antennas. Now we calculate a precoding matrix for the signal of the first MS. Suppose that a set of direction matrices specified for the first MS is $C_i$, i=1, 2, . . . , M, and the matrices are allocated to all cooperative BSs sequentially. $C_i$ is an $(N-1)n \times n$ matrix. At the time of sending the signal of the first MS, the interfering channel of cooperative BS i is expressed as $H_{Ti}$. $H_{Ti}$ is an $(N-1)n \times m$ matrix. The precoding matrix that needs to be calculated by BS i is $W_{1i}$. $W_{1i}$ is an $m \times n$ matrix. For the purpose of calculating out the precoding matrix, the following equation needs to be solved:

$$H_{T1}W_{11}=C_1, \quad (7)$$

$$H_{T2}W_{12}=C_2, \quad (8)$$

...

$$H_{TM}W_{1M}=C_M, \quad (9)$$

Equations (7)-(9) can be solved only if the number of rows of $H_{Ti}$ is not greater than the number of columns (namely, $m \geq (N-1)n$):

$$W_{1i}=\text{pinv}(H_{Ti})C_i. \quad (10)$$

In the same way, the precoding matrices of other MSs are calculated out.

Therefore, the solution provided in this embodiment is applicable to multi-BS multi-MS scenarios.

Persons of ordinary skill in the art understand that all or part of the steps of the method in the embodiments of the present invention may be implemented by a program instructing relevant hardware. The program may be stored in computer readable storage media such as ROM/RAM, magnetic disk or CD-ROM.

Figure 6:
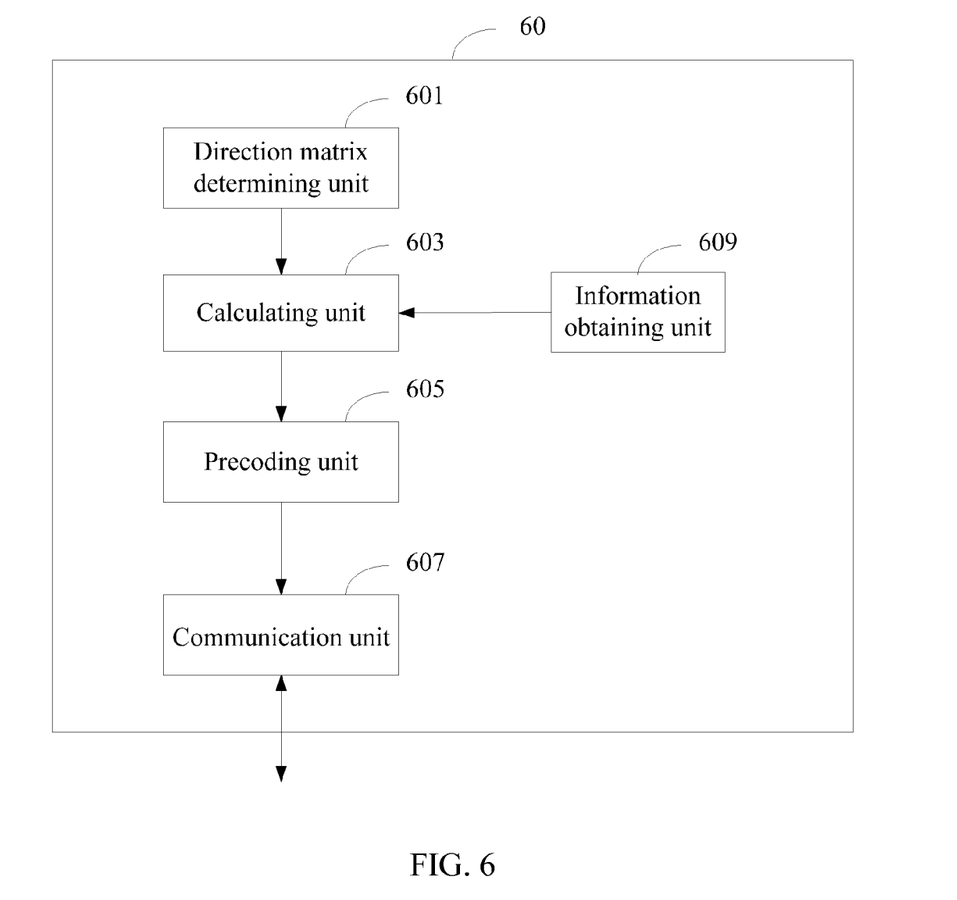
FIG. 6 is a block diagram of a BS according to an embodiment of the present invention.

Further, an apparatus or device for implementing the foregoing method is disclosed. In practice, the apparatus or device may be a BS. Notice that the BS disclosed herein works in conjunction with the existing BSs, and should be understood as covering the well-known functions of a cooperative BS. FIG. 6 shows a structure of a BS according to an embodiment of the present invention.

The BS 60 includes:

a direction matrix determining unit 601, configured to obtain a direction matrix corresponding to a destination MS, where the number of rows of the direction matrix depends on the total number of antennas of MSs in a cooperative area and the number of antennas of the destination MS, and the number of columns of the direction matrix depends on the number of code streams sent to the destination MS;

a calculating unit 603, configured to calculate a precoding matrix according to local CSI and the direction matrix;

a precoding unit 605, configured to perform precoding according to the precoding matrix; and a communication unit 607, configured to perform cooperative communication according to a result of the precoding.

The BS further includes:

an information obtaining unit 609, configured to obtain the local CSI and data information of all MSs in the cooperative set, where the local CSI includes the CSI between the BS and all MSs served by the BS. In practice, the calculating unit may calculate the precoding matrix according to the local CSI and the direction matrix. Specifically, the calculating unit obtains a channel matrix between the BS and all MSs except the destination MS according to the local CSI, and then can calculate out the precoding matrix according to the direction matrix which is equal to the product of the channel matrix and the precoding matrix.

The BS disclosed herein enables the eliminating of interference between users by specifying a direction matrix. In a multi-user multi-antenna scenario, the use of a direction matrix avoids the following restriction: The total interference is not zero unless the interference caused by every cooperative BS onto all MSs other than the destination MS is zero. Therefore, the number of antennas of a BS is not restricted, namely, fewer antennas of the BS can accomplish good effects.

Figure 7:
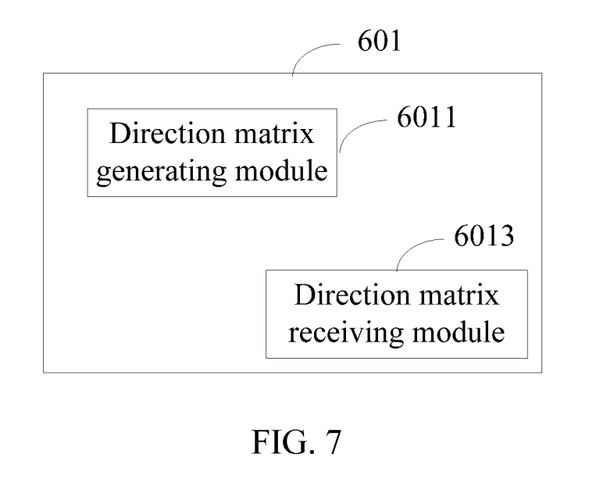
FIG. 7 is a schematic diagram of a direction matrix determining unit according to a first embodiment of the present invention.

FIG. 7 is a schematic diagram of a direction matrix determining unit 601 according to a first embodiment of the present invention. The direction matrix determining unit 601 includes:

a direction matrix generating module 6011, configured to generate a direction matrix through calculation; or a direction matrix receiving module 6013, configured to receive the direction matrix sent by another BS or a cooperative communication network scheduling party. The number of rows of the direction matrix determined by the direction matrix determining unit 601 is equal to the total number of antennas of MSs in the cooperative area that covers the BS minus the number of antennas of the MS to be precoded, and the number of columns of the direction matrix is equal to the number of code streams of the MS to be precoded.

Figure 8:
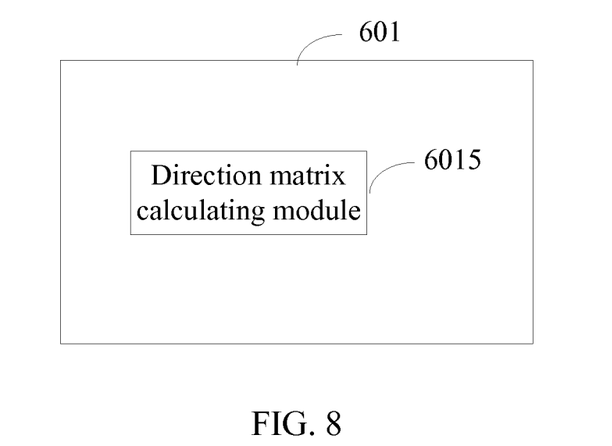
FIG. 8 is a schematic diagram of a direction matrix determining unit according to a second embodiment of the present invention.

FIG. 8 is a schematic diagram of a direction matrix determining unit 601 according to a second embodiment of the present invention. The direction matrix determining unit 601 includes:

a direction matrix calculating module 6015, configured to preset allocation order of the current BS in multiple cooperative BSs, calculate a set of direction matrices corresponding to the MSs in the service scope of the BS, and select a direction matrix corresponding to the allocation order.

As will be apparent to one of ordinary skill in the art, the various "units" and "modules" contained within the BS as described above are logical entities that may be physically implemented with shared or separate components using hardware (e.g., processors or ASICs) or a combination of hardware and software.

Although the present invention has been described with reference to specific embodiments thereof, it will be evident that various changes and modifications can be made thereto without departing from the spirit and scope of the invention. The specification and drawings are, accordingly, to be regarded simply as an illustration of the invention as defined by the appended claims.

What is claimed is:

1. A method of performing cooperative communications in a wireless network, comprising:

obtaining a matrix corresponding to a destination mobile station (MS), wherein the number of rows of the matrix depends on the total number of antennas of MSs in a cooperative area and the number of antennas of the destination MS, and the number of columns of the matrix depends on the number of code streams sent to the destination MS;

calculating a precoding matrix according to local channel state information (CSI) and the matrix;

performing precoding according to the precoding matrix; and performing cooperative communications according to a result of the precoding, wherein the number of rows of the matrix is equal to the total number of antennas of MSs minus the number of antennas of the MS to be precoded, and the number of columns of the matrix is equal to the number of code streams to be precoded of the MS.

2. A method of performing cooperative communications in a wireless network, comprising:

obtaining a matrix corresponding to a destination mobile station (MS), wherein the number of rows of the matrix depends on the total number of antennas of MSs in a cooperative area and the number of antennas of the destination MS, and the number of columns of the matrix depends on the number of code streams sent to the destination MS;

calculating a precoding matrix according to local channel state information (CSI) and the matrix:

performing precoding according to the precoding matrix; and performing cooperative communications according to a result of the precoding, wherein a norm of a sum of a set of matrices for each destination MS is not greater than a threshold, wherein the threshold is zero or set according to system requirements.

3. A method of performing cooperative communications in a wireless network, comprising:

obtaining a matrix corresponding to a destination mobile station (MS), wherein the number of rows of the matrix depends on the total number of antennas of MSs in a cooperative area and the number of antennas of the destination MS, and the number of columns of the matrix depends on the number of code streams sent to the destination MS;

calculating a precoding matrix according to local channel state information (CSI) and the matrix:

performing precoding according to the precoding matrix; and performing cooperative communications according to a result of the precoding, wherein the step of obtaining a matrix corresponding to a destination MS comprises presetting an allocation order of a current base station (BS) in multiple cooperative BSs, calculating the matrix for MSs covered in a service scope of the current BS, and selecting the matrix corresponding to the allocation order; and wherein the step of calculating the precoding matrix according to the local CSI and the matrix comprises obtaining a channel matrix between the current BS and all MSs except the destination MS according to the local CSI, and obtaining, through calculation, the precoding matrix according to the matrix which is equal to a product of the channel matrix and the precoding matrix.

4. A cooperative base station (BS), comprising:

a matrix determining unit configured to obtain a matrix corresponding to a destination mobile station (MS), wherein the number of rows of the matrix depends on the total number of antennas of MSs in a cooperative area and the number of antennas of the destination MS, and the number of columns of the matrix depends on the number of code streams sent to the destination MS;

a calculating unit configured to calculate a precoding matrix according to local channel state information (CSI) and the matrix;

a precoding unit configured to perform precoding according to the precoding matrix; and a communication unit configured to perform cooperative communications according to a result of the precoding, wherein the matrix obtained by the matrix determining unit is characterized by the number of rows of the matrix is equal to the total number of antennas of MSs in a cooperative area minus the number of antennas of the MS to be precoded, and the number of columns of the matrix is equal to the number of code streams of the MS to be precoded.

5. A cooperative base station (BS), comprising:

a matrix determining unit configured to obtain a matrix corresponding to a destination mobile station (MS), wherein the number of rows of the matrix depends on the total number of antennas of MSs in a cooperative area and the number of antennas of the destination MS, and the number of columns of the matrix depends on the number of code streams sent to the destination MS;

a calculating unit configured to calculate a precoding matrix according to local channel state information (CSI) and the matrix;

a precoding unit configured to perform precoding according to the precoding matrix; and a communication unit configured to perform cooperative communications according to a result of the precoding, wherein the calculating unit configured to calculate the precoding matrix according to the local CSI and the matrix obtain a channel matrix between the current BS and all MSs except the destination MS according to the local CSI, and obtain, through calculation, the precoding matrix according to the matrix which is equal to a product of the channel matrix and the precoding matrix.

6. A system for performing cooperative communications in a wireless network, comprising:

a base station (BS) configured to obtain a matrix, calculate a precoding matrix according to local channel state information (CSI) and the matrix, and perform precoding according to the precoding matrix; and a first mobile station (MS), wherein:

the BS and the first MS are located within a cooperative area and are configured to cooperatively communicate with each other according to a result of the precoding, and the matrix corresponds to the first MS, and the number of rows of the matrix depends on the total number of antennas of MSs in the cooperative area and the number of antennas of the first MS, and the number of columns of the matrix depends on the number of code streams sent to the first MS;

wherein the base station calculates the precoding matrix according to the local CSI and the matrix by obtaining a channel matrix between the current BS and all MSs except the destination MS according to the local CSI, and obtaining, through calculation, the precoding matrix according to the matrix which is equal to a product of the channel matrix and the precoding matrix.

* * * * *